United States Patent
Kobayashi

(10) Patent No.: US 10,370,037 B2
(45) Date of Patent: Aug. 6, 2019

(54) VEHICLE FRONT STRUCTURE

(71) Applicant: SUBARU CORPORATION, Tokyo (JP)

(72) Inventor: Ryuya Kobayashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 4 days.

(21) Appl. No.: 15/873,127

(22) Filed: Jan. 17, 2018

(65) Prior Publication Data

US 2018/0281869 A1 Oct. 4, 2018

(30) Foreign Application Priority Data

Mar. 28, 2017 (JP) .................. 2017-062513

(51) Int. Cl.
| | |
|---|---|
| *B62D 25/08* | (2006.01) |
| *B60S 1/46* | (2006.01) |
| *B60S 1/52* | (2006.01) |
| *B60S 1/04* | (2006.01) |

(52) U.S. Cl.
CPC .............. *B62D 25/081* (2013.01); *B60S 1/46* (2013.01); *B60S 1/52* (2013.01); *B60S 1/0463* (2013.01)

(58) Field of Classification Search
CPC . B62D 25/081; B60S 1/46; B60S 1/52; B60S 1/0463
USPC .............................. 296/192, 96.15; 15/250.01
See application file for complete search history.

(56) References Cited

U.S. PATENT DOCUMENTS

| | | | | |
|---|---|---|---|---|
| 4,210,283 | A | * | 7/1980 | Stouffer .................... B05B 1/08 239/11 |
| 2005/0040674 | A1 | * | 2/2005 | VanIterson ................ B05B 1/08 296/192 |
| 2013/0255024 | A1 | | 10/2013 | Kaminaga et al. |
| 2017/0057463 | A1 | * | 3/2017 | Yamamoto ............ B60S 1/0402 |
| 2018/0281869 | A1 | * | 10/2018 | Kobayashi ........... B62D 25/081 |

FOREIGN PATENT DOCUMENTS

| | | | | |
|---|---|---|---|---|
| DE | 102018100311 | * | 9/2018 | .......... B62D 25/081 |
| JP | UM-A-S50-074634 A | | 11/1973 | |
| JP | UM-A-S53-048339 A | | 9/1976 | |
| JP | UM-A-S53-108042 A | | 2/1977 | |
| JP | 2013-208992 A | | 10/2013 | |
| JP | 2015-024777 A | | 2/2015 | |

OTHER PUBLICATIONS

Reasons for Refusal dated Sep. 25, 2018 during the prosecution of Japanese Patent Application No. 2017-062513.

* cited by examiner

*Primary Examiner* — Gregory A Blankenship
(74) *Attorney, Agent, or Firm* — Troutman Sanders LLP

(57) ABSTRACT

A vehicle front structure includes a cowl and one or more washer nozzles. The cowl is disposed between a front window glass and a front hood, which are disposed at a vehicle front. The cowl includes a recess extending in a vehicle width direction. The one or more washer nozzles are disposed at the cowl and configured to eject a washer fluid to the front window glass. The cowl includes plate members that stand erect in the recess and extend in a vehicle front-rear direction. The plate members are disposed on both vehicle-widthwise outer sides of an area in which the one or more washer nozzles are disposed.

11 Claims, 5 Drawing Sheets

VEHICLE FRONT STRUCTURE

CROSS-REFERENCE TO RELATED APPLICATIONS

The present application claims priority from Japanese Patent Application No. 2017-062513 filed on Mar. 28, 2017, the entire contents of which are hereby incorporated by reference.

BACKGROUND

1. Technical Field

The present invention relates to a vehicle front structure, and particularly, to a vehicle front structure including a washer nozzle, which is disposed at a cowl between a front window glass and a front hood and ejects a washer fluid the front window glass and the front hood.

2. Related Art

A vehicle usually includes, at its front portion, a washer nozzle that ejects a washer fluid to a front window glass to wipe off dirt adhering to the outer surface of the front window glass.

For example, Japanese Unexamined Patent Application Publication (JP-A) No. 2013-208992 describes a vehicle front structure including a recessed cowl extending in the vehicle width direction between a front window glass and a front hood of the vehicle, and a washer nozzle disposed in the cowl. This front structure includes a combination of washer nozzles that eject a washer fluid to areas of different sizes to feed an amount of the washer fluid sufficient for the required areas.

In the vehicle front structure described in JP-A-No. 2013-208992, however, as illustrated in FIG. 5, an airstream flowing from a front hood 160 toward a front window glass 120 during traveling of the vehicle flows into a cowl 130 and causes a vortex therein, which hinders a washer fluid ejected from washer nozzles 144-1 and 144-2 during traveling of the vehicle from being fully fed to the intended areas.

For example, while a vehicle is travelling on a snow-covered road and an expressway, the vehicle may have dirt adhering to the front window glass as a result of, for example, a large-sized vehicle travelling near the vehicle splashing dirt with its tire. In such a case, a driver needs to eject a washer fluid, during driving, to wipe off the dirt adhering to the front window glass. Here, an airstream has entered the recessed cowl from the front and caused a vortex in the cowl. The vortex disperses the washer fluid in the vehicle width direction, so that the driver fails to feed the washer fluid to the appropriate areas.

To reduce a vortex caused in the cowl, thus far, the space inside the recessed cowl has been partitioned with a large number of plate members extending in the front-rear direction.

Although the plate members can reduce a vortex, the plate members cause an airstream that divides the fluid ejected from the washer nozzles, and the airstream hinders the washer fluid from arriving at an upper area of the front window glass.

SUMMARY OF THE INVENTION

It is desirable to provide a vehicle front structure that allows a washer fluid to arrive at an upper area of a front window glass while a vehicle is travelling.

An aspect of the present invention provides a vehicle front structure that includes a cowl and one or more washer nozzles. The cowl is disposed between a front window glass and a front hood, which are disposed at a vehicle front. The cowl includes a recess extending in a vehicle width direction. The one or more washer nozzles are disposed at the cowl and configured to eject a washer fluid to the front window glass. The cowl includes plate members that stand erect in the recess and that extend in a vehicle front-rear direction. The plate members are disposed on both vehicle-widthwise outer sides of an area in which the one or more washer nozzles are disposed.

DETAILED DESCRIPTION

Figure 1:
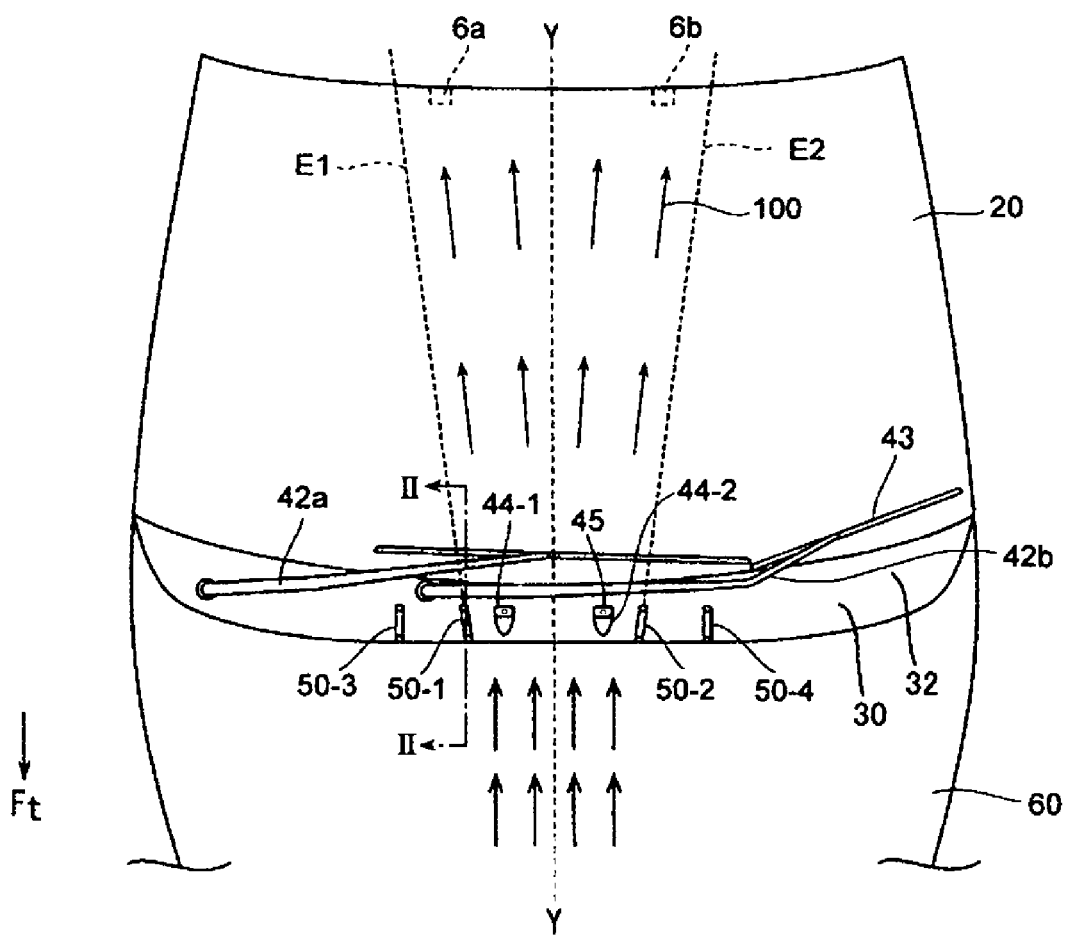
FIG. 1 is a plan view of a vehicle front structure according to an example of the present invention.
Figure 2:
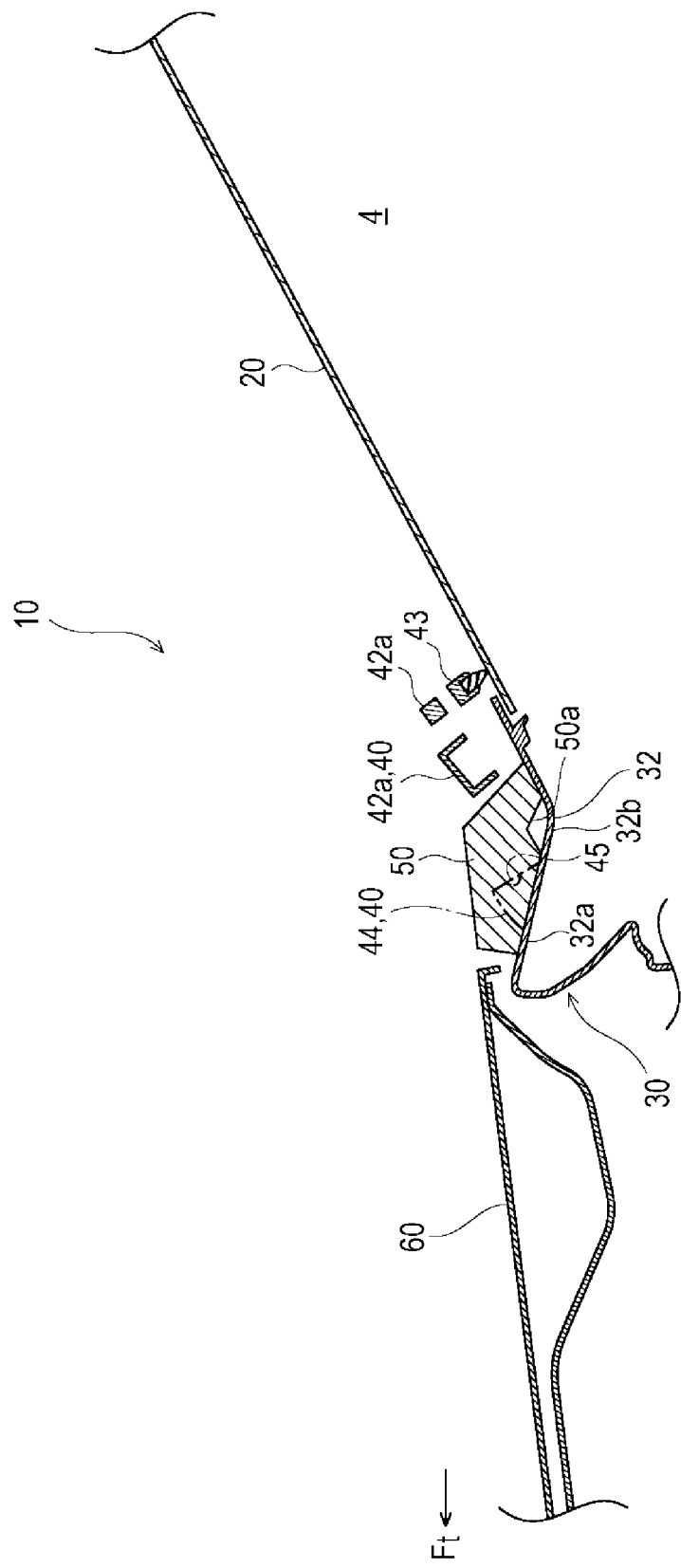
FIG. 2 is a sectional view of the vehicle front structure taken along line II-II of FIG. 1.

Now, a vehicle front structure according to an example of the present invention is described in detail with reference to FIG. 1 and FIG. 2. FIG. 1 is a plan view of a vehicle front structure according to the present example, and FIG. 2 is a sectional view of the vehicle front structure taken along line II-II of FIG. 1. Throughout the drawings, Ft denotes the vehicle frontward direction, and line Y-Y denotes the center line of the vehicle in the vehicle width direction.

As illustrated in FIG. 1 and FIG. 2, a vehicle front structure 10 includes a front window glass 20, a cowl 30, interposed between the front window glass 20 and a front hood 60, a washer 40, which cleans the front window glass 20, and plate members 50, which stand erect in the cowl 30.

The front window glass 20 is disposed in front of a vehicle cabin 4. For example, the front window glass 20 is made of, for example, either one of a laminated glass and a toughed glass having two-dimensionally curved surfaces. In the vehicle cabin 4, a pair of imagers 6a and 6b are disposed on the inner surface of the front window glass 20 to the left and right of the vehicle-widthwise center line (line Y-Y). Examples usable as the imagers 6a and 6b include stereo cameras.

The cowl 30 stretches between front fenders, not illustrated, and extends in the vehicle width direction. The cowl 30 is made of a curved plate member. As illustrated in FIG. 2, the cowl 30 has a recess 32, recessed toward the vehicle lower side. The recess 32 extends in the vehicle width direction. The recess 32, illustrated as an example, has a letter V shaped cross section. However, the recess 32 may have other shapes, such as, a letter U shaped cross section.

The washer 40 includes wiper arms 42a and 42b, which wipe off dirt on the front window glass 20, and one or more washer nozzles 44. The washer 40 of the present example includes two washer nozzles 44-1 and 44-2. The two washer nozzles 44-1 and 44-2 are disposed to the left and right in the vehicle width direction, substantially symmetrically with respect to the vehicle-widthwise center line.

The wiper arms 42a and 42b and the washer nozzles 44-1 and 44-2 are disposed in the recess 32 of the cowl 30. In FIG.

2, the position at which the washer nozzles 44 are disposed in the vehicle front-rear direction is drawn with an imaginary line.

Each washer nozzle 44 is attached to a side wall 32a of the recess 32 closer to the front hood 60. Each washer nozzle 44 has a nozzle hole 45, which is open obliquely upward to the vehicle rear. Each washer nozzle 44 is coupled to a tank, which is not illustrated and stores a washer fluid, and ejects the washer fluid to the outer surface of the front window glass 20 using a pump.

Plate members 50 stand erect in the recess 32 of the cowl 30 so as to protrude upward. Plate members 50-1 to 50-n extend in the vehicle front-rear direction. As illustrated in FIG. 1, the plate members 50 are disposed on both vehicle-widthwise outer sides of an area in which the washer nozzles 44 are disposed, instead of in the area in which the washer nozzles 44 are disposed (specifically, not disposed between the washer nozzles 44-1 and 44-2 adjacent to each other in the vehicle width direction). In the present example, the plate members 50 are disposed two on each of the vehicle-widthwise outer sides of the area in which the washer nozzles 44 are disposed, that is, four plate members 50-1 to 50-4 are disposed in total. A large number of the plate members 50 may be disposed on each of the vehicle-widthwise outer sides of the area in which the washer nozzles 44 are disposed, as long as at least one plate member 50 is disposed on each of the vehicle-widthwise outer sides. In the present example, the washer nozzles 44-1 and 44-2 are disposed closer to the vehicle-widthwise center than the plate members 50-1 to 50-4.

Among the plate members 50, the pair of plate members 50-1 and 50-2, disposed on the left and right in the vehicle width direction and closest to the area in which the washer nozzles 44 are disposed, are disposed close to the adjacent washer nozzles 44-1 and 44-2. In the present example, the washer nozzle 44-1 and the plate member 50-1 are disposed close to each other with a gap interposed therebetween in the vehicle width direction. Similarly, the washer nozzle 44-2 and the plate member 50-2 are disposed close to each other with a gap interposed therebetween in the vehicle width direction. The distance between the washer nozzle 44-1 and the plate member 50-1 and the distance between the washer nozzle 44-2 and the plate member 50-2 are determined not to exceed, for example, 5 cm.

As illustrated in FIG. 1, the pair of left and right plate members 50-1 and 50-2 are disposed so as to form a V shape, in a plan view of the vehicle, to gradually extend outward in the vehicle width direction from the front end toward the rear end. In the example illustrated, the plate members 50-3 and 50-4 disposed on the vehicle-widthwise outer sides of the pair of plate members 50-1 and 50-2 extend substantially parallel to the vehicle-widthwise center line.

In the present example, the pair of plate members 50-1 and 50-2 are disposed symmetric with respect to the vehicle-widthwise center line, but may not be disposed linearly symmetric with each other. For example, the plate member 50-1 may extend parallel to the vehicle-widthwise center line and the plate member 50-2 may extend obliquely with respect to the vehicle-widthwise center line. The center position between the two plate members 50-1 and 50-2 may be displaced to either one of left and right from the vehicle-widthwise center line.

As illustrated in FIG. 1, in the present example, the pair of plate members 50-1 and 50-2 are disposed on the inner side of the pair of imagers 6a and 6b in the vehicle width direction. The imagers 6a and 6b are disposed within the range between the directions in which the plate members 50-1 and 50-2 extend. Here, all the plate members 50 may be disposed on both outer sides of the imagers 6a and 6b in the vehicle width direction.

The plate members 50 partition the recess 32 in the cowl 30 to prevent the airstream that flows into the cowl 30 from the front hood 60 from flowing in the vehicle width direction in the form of turbulence inside the cowl 30, and to reorient the airstream toward the front window glass 20. If the plate members 50 can effectively reorient the airstream that flows into the cowl 30, the plate members 50 do not have to thoroughly partition the recess 32.

For example, as illustrated in FIG. 2, an area of the cowl 30 holding the wiper arms 42a and 42b and wiper blades 43 is not partitioned by the plate members 50. Each plate member 50 may have a cutout 50a at a bottom portion 32b of the recess 32.

The cutout 50a allows rainwater and the like accumulated at the bottom portion 32b of the cowl 30 to move outward in the vehicle width direction.

As illustrated in FIG. 1, in the above-described vehicle front structure 10, the plate members 50 standing erect in the cowl 30 redirect the airstream flowing from the vehicle front and can reduce a vortex that occurs in the cowl 30. The redirected airstream flows between the plate members 50 from the lower side to the upper side of the front window glass 20. Between the pair of plate members 50-1 and 50-2 and mainly in the area defined by the broken lines E1 and E2, which denote the directions in which the plate members 50-1 and 50-2 extend, the airstream flows from the lower side to the upper side of the front window glass 20. This structure allows the washer fluid ejected from the washer nozzles 44 to be carried on the airstream (airstream denoted with solid arrows 100 in FIG. 1) flowing between the pair of plate members 50-1 and 50-2 and to be fed to the upper area of the front window glass 20.

Figure 4:
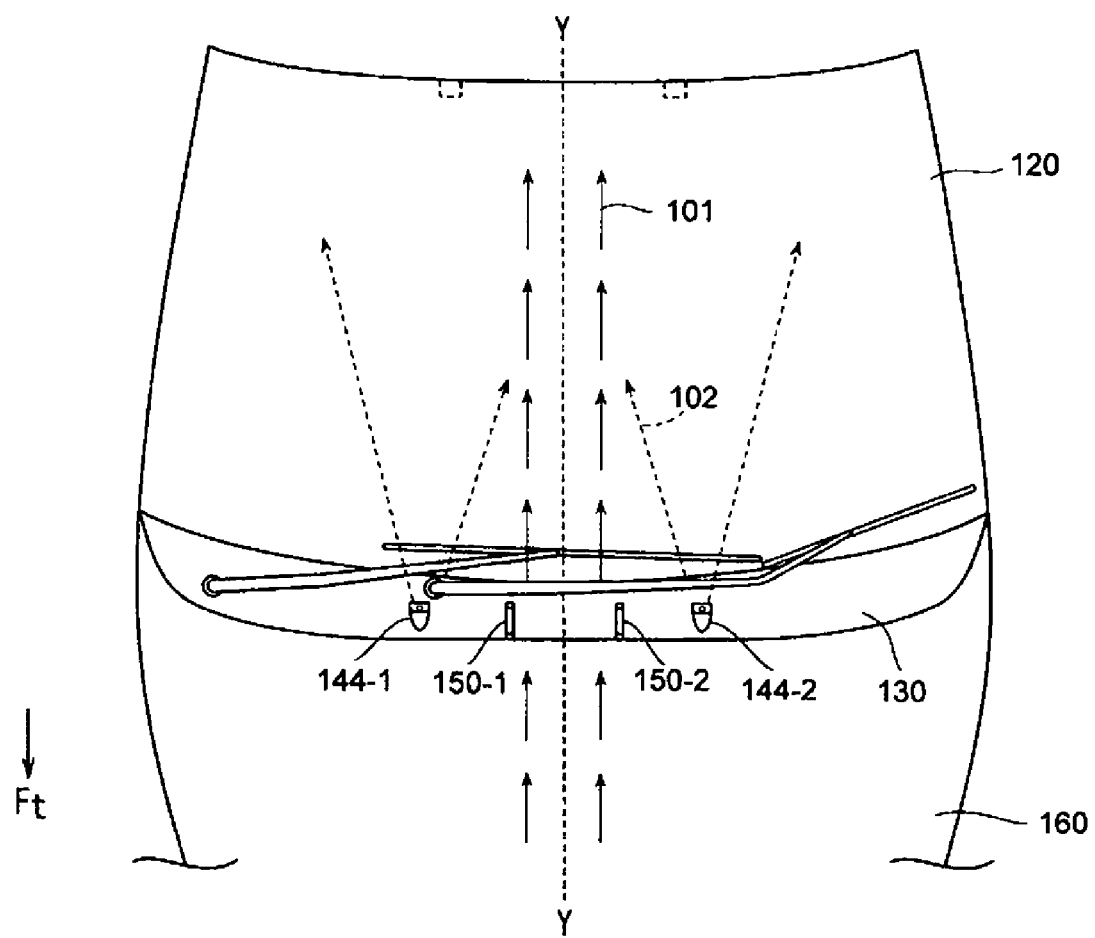
FIG. 4 is a plan view of an existing vehicle front structure including plate members.
Figure 5:
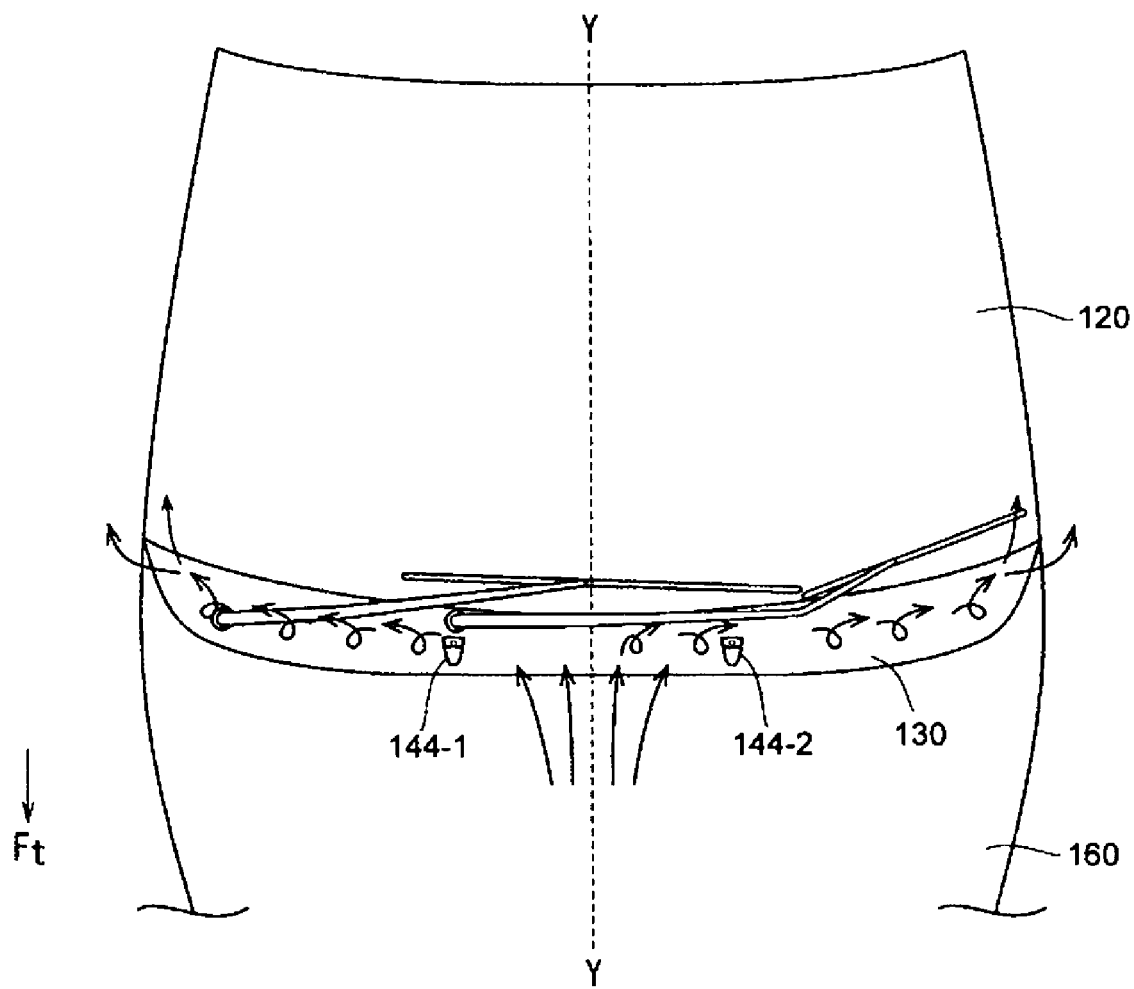
FIG. 5 is a plan view of an existing vehicle front structure.

The plate members 50 are not disposed in the area in which the washer nozzles 44 are disposed. Thus, the washer fluid is not divided by the airstream caused by the plate members 50. As illustrated in FIG. 4, when the plate members 150-1 and 150-2 are disposed in the area in which the washer nozzles 144-1 and 144-2 are disposed, an airstream 101 that flows between the plate members 150-1 and 150-2 during traveling of the vehicle may divide the washer fluid ejected in the manner as indicated with broken arrows 102, and this structure may have low ejection performance.

In the front structure 10 according to the present example, the plate members 50 are not disposed in the area in which the washer nozzles 44 are disposed. Thus, as illustrated in FIG. 1, the washer fluid is not divided by the airstream caused by the plate members 50. This structure can thus enhance the performance of ejecting the washer fluid during traveling of the vehicle. In addition, the plate members 50-1 and 50-2 and the washer nozzles 44-1 and 44-2 are disposed close to each other. This structure can thus eject the washer fluid accurately using the effect of the airstream caused by the plate members 50-1 and 50-2.

An airstream mainly flows from a vehicle-widthwise central area of the front hood 60 into the cowl 30. Here, all the washer nozzles 44 are disposed closer to the vehicle-widthwise center portion than the plate members 50. This structure can thus enhance the performance of ejecting the washer fluid using the airstream flowing through the central area.

In addition, the plate members 50-3 and 50-4 are disposed on both vehicle-widthwise outer sides of the pair of plate members 50-1 and 50-2. This structure can more reliably prevent the turbulence caused in the cowl 30 from flowing in the vehicle width direction. Disposing the plate members 50-3 and 50-4 close to and adjacent to the pair of plate members 50-1 and 50-2 can enhance the effect of interrupting the turbulence.

Figure 3:
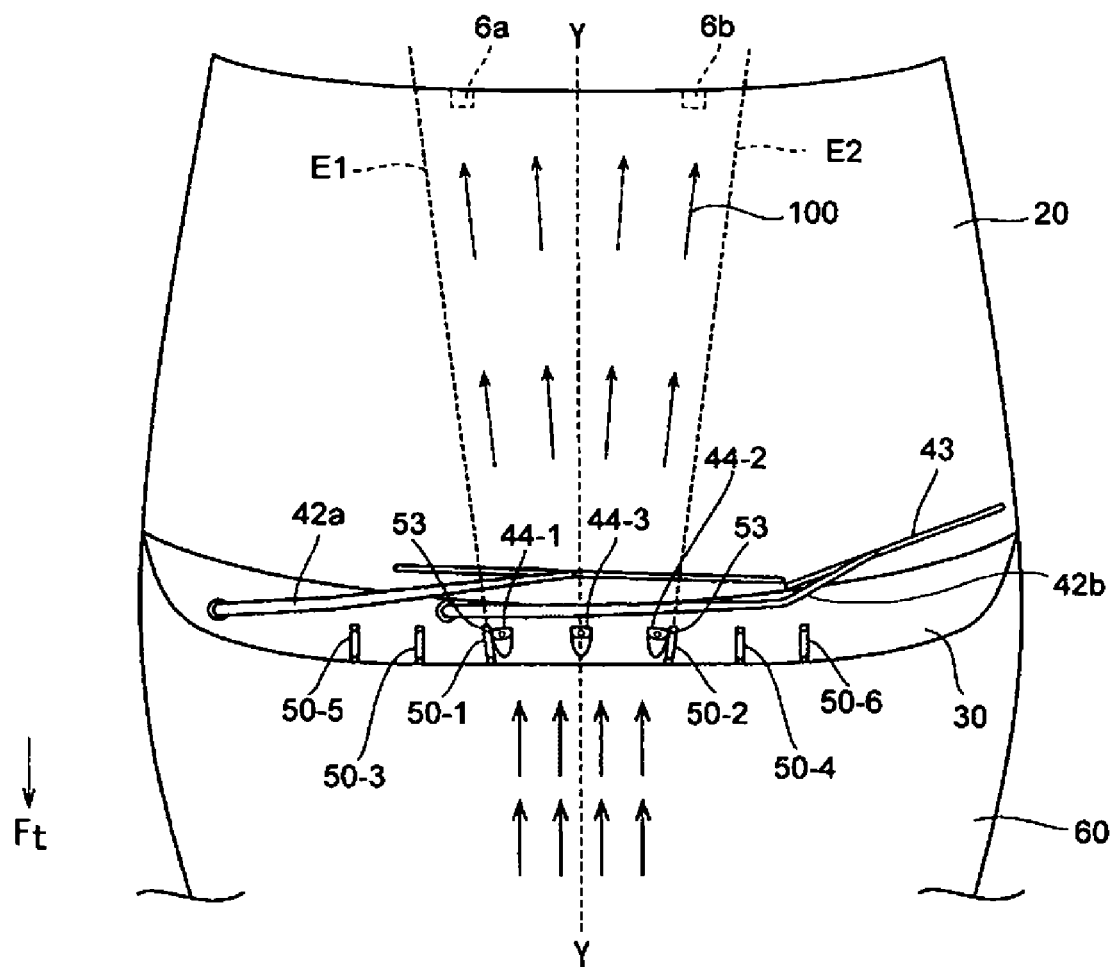
FIG. 3 is a plan view of plate members and washer nozzles according to a modification example.

FIG. 3 is a plan view of plate members 50 and washer nozzles 44 according to a modification example. In FIG. 3, components the same as those of the example illustrated in FIG. 1 and FIG. 2 are denoted with the same reference symbols and not described.

In the modification example, three washer nozzles 44-1 to 44-3 are disposed in the cowl 30, and three plate members 50 are disposed on each of both vehicle-widthwise outer sides of the area in which the washer nozzles 44 are disposed (the area in the cowl 30 interposed between the washer nozzles 44-1 and 44-2 in the vehicle width direction).

The washer nozzles 44-1 and 44-2, disposed both vehicle-widthwise outermost sides in the area in which the washer nozzles 44 are disposed, are respectively integrated with the plate members 50-1 and 50-2 at respective inner surfaces 53 in the vehicle width direction. The plate members 50-1 and 50-2 extend further to the vehicle rear beyond the nozzle holes 45 of the washer nozzles 44-1 and 44-2. The nozzle holes 45 of the washer nozzles 44-1 and 44-2 are open toward the directions in which the plate members 50-1 and 50-2 extend. The washer nozzle 44-3 is disposed at the vehicle-widthwise center portion.

When ejecting a washer fluid during traveling of the vehicle, the vehicle front structure 10 illustrated in FIG. 3 can effectively use the airstream caused by the pair of plate members 50-1 and 50-2 to feed the fluid ejected from the washer nozzles 44-1 to 44-3 to the upper area of the front window glass 20. In addition, the vehicle front structure 10 can adjust the directions in which the washer fluid is ejected from, particularly, the washer nozzles 44-1 and 44-2 by disposing the plate members 50-1 and 50-2 in appropriate directions. This structure can more accurately eject the washer fluid to the intended range.

In addition, the plate members 50-1 and 50-2 are respectively integrated with the washer nozzles 44-1 and 44-2. This structure can reduce the number of components. As in the modification example, the structure that includes washer nozzles 44 and a large number of plate members 50 is preferable, because it can prevent an increase in number of components by thus integrating some of the washer nozzles 44 and the plate members 50, while having the redirecting effect in the cowl 30 and the performance of ejecting the washer fluid enhanced.

The present invention is not limited to the above-described example and the above-described modification example, and may be modified in various manners within the scope not departing from the gist of the invention.

For example, a structure may include only one washer nozzle 44 disposed in the cowl 30. In this structure, the pair of plate members 50-1 and 50-2 disposed on both vehicle-widthwise outer sides of the washer nozzle 44 are preferably disposed adjacent to the washer nozzle 44 with gaps between themselves and the washer nozzle 44.

According to the examples and modifications, plate members stand erect in a cowl, and all washer nozzles in the cowl are disposed between two of the plate members adjacent to each other in the vehicle width direction. This structure thus allows a washer fluid to arrive at an upper area of a front window glass without the washer fluid being divided by an airstream during traveling of the vehicle.

The invention claimed is:

1. A vehicle front structure, comprising:
   a cowl disposed between a front window glass and a front hood, which are disposed at a vehicle front, and comprising a recess extending in a vehicle width direction; and
   washer nozzles that are disposed at the cowl and configured to eject a washer fluid to the front window glass,
   wherein the cowl comprises plate members that stand erect in the recess and extend in a vehicle front-rear direction,
   wherein the plate members are disposed on both vehicle-widthwise outer sides of an area in which the washer nozzles are disposed
   wherein the washer nozzles are disposed closer to a vehicle-widthwise center portion than any of the plate members, and
   wherein among the plate members, a pair of plate members disposed on left and right sides in the vehicle width direction and closest to the area in which the washer nozzles are disposed are more inclined relative to the vehicle front-rear direction than the other plate members in such a manner that the pair of plate members gradually extend outward in the vehicle width direction from the front end toward the rear end.

2. The vehicle front structure according to claim 1, further comprising a pair of left and right imagers disposed on an inner surface of a front window glass,
   wherein the pair of plate members disposed on the left and right sides in the vehicle width direction and closest to the area in which the washer nozzles are disposed on an inner side of the pair of left and right imagers in the vehicle width direction, while the other plate members are disposed on an outer side of the pair of left and right imagers in the vehicle width direction.

3. The vehicle front structure according to claim 1, wherein, the pair of plate members disposed on the left and right sides in the vehicle width direction and closest to the area in which the washer nozzles are disposed are disposed adjacent to the washer nozzles.

4. The vehicle front structure according to claim 2, wherein, the pair of plate members disposed on the left and right sides in the vehicle width direction and closest to the area in which the washer nozzles are disposed are disposed adjacent to the washer nozzles.

5. The vehicle front structure according to claim 4, wherein the washer nozzles are integrated with the pair of plate members on the left and right sides, on inner surfaces of the plate members in the vehicle width direction.

6. The vehicle front structure according to claim 5, wherein the washer nozzles are integrated with the pair of plate members on the left and right sides, on inner surfaces of the plate members in the vehicle width direction.

7. The vehicle front structure according to claim 1, further comprising a pair of left and right imagers disposed on an inner surface of a front window glass,
   wherein all of the plate members are disposed on an outer side of the pair of left and right imagers in the vehicle width direction.

8. The vehicle front structure according to claim 2, wherein, the pair of plate members disposed on the left and right sides in the vehicle width direction and closest to the area in which the washer nozzles are disposed are disposed adjacent to the washer nozzles.

9. The vehicle front structure according to claim 7, wherein, the pair of plate members disposed on the left and right sides in the vehicle width direction and closest to the area in which the washer nozzles are disposed are disposed adjacent to the washer nozzles.

10. The vehicle front structure according to claim 8, wherein the washer nozzles are integrated with the pair of plate members on the left and right sides, on inner surfaces of the plate members in the vehicle width direction.

11. The vehicle front structure according to claim 9, wherein the washer nozzles are integrated with the pair of plate members on the left and right sides, on inner surfaces of the plate members in the vehicle width direction.

* * * * *